United States Patent
Gaiser

[19]

[11] Patent Number: 5,828,570
[45] Date of Patent: Oct. 27, 1998

[54] UNCONSTRAINED 2-D TRANSFORMATION FILTER

[75] Inventor: James E. Gaiser, Littleton, Colo.

[73] Assignee: Western Atlas International, Inc., Houston, Tex.

[21] Appl. No.: 536,992

[22] Filed: Sep. 29, 1995

[51] Int. Cl.[6] .................... G01V 1/30; G01V 1/28; G06F 19/00
[52] U.S. Cl. ............. 364/422; 364/572; 364/724.01; 367/14; 367/37; 367/38
[58] Field of Search ............. 324/323; 364/422, 364/572, 724.01; 367/14, 37, 38, 43, 45, 73

[56] References Cited

U.S. PATENT DOCUMENTS 4,006,481   2/1977   Young et al. .................. 324/329 X

FOREIGN PATENT DOCUMENTS 0572321   5/1993   European Pat. Off. .

OTHER PUBLICATIONS

Hale, Dave; "3–D depth migration via McClellan transformations", Geophysics, 1991, pp. 1–18.

Hazra, Satya N. and Reddy, M. Sudhakara; "Design of Circularly Symmetric Low–Pass Two–Dimensional FIR Digital Filters Using Transformation", IEEE Transactions on Circuits and Systems, vol. CAS–33, No. 10, Oct. 1986, 5 pages.

Primary Examiner—Edward R. Cosimano
Attorney, Agent, or Firm—William A. Knox

[57] ABSTRACT

An unconstrained transformation filter operator that is efficient in terms of computer resources and that improves circularly symmetric migrated impulse response for steep dips. The filter operator combines selected desirable attributes of the more efficient McClellan transformation filter with selected desirable attributes of the more accurate Laplacian transformation filter. The novel filter operator is not constrained along the $k_x$ and $k_y$ spatial axes by the requirement that it equal cos (k). The transformation filter is averaged over all azimuths to improve its accuracy of response.

6 Claims, 2 Drawing Sheets

UNCONSTRAINED 2-D TRANSFORMATION FILTER

BACKGROUND OF THE INVENTION

1. Field of the Invention

A transformation filter for migrating post-stack 3-D data using the explicit finite difference method, that is economical of computer resources when implemented and which will provide improved circular symmetry for steep dips.

2. Discussion of Related Art

The method of this invention provides a computer-implemented filter operator that processes stacked three-dimensional time-scale recordings of seismic reflection data signals to transform those signals into a different state that exhibits an accurate image of the attitude of dipping sub-surface earth layers whence the seismic reflections originated, along all azimuths.

Although the art of geophysical seismic exploration is well known, a brief tutorial review is here presented. In FIG. 1, the surface of the earth is shown as 10, having coordinates in x and y as shown by 14. The surface includes the ground surface on land or the water surface at sea. A sub-surface stratum 12 has a dip of $\phi°$. The earth formations between surface 10 and stratum 12 may be characterized by an average acoustic propagation velocity of c. An acoustic source S radiates a wavefield which propagates downwardly along trajectories 16, 18 and 20 and is reflected from stratum 12 at incident points $P_1$, $P_2$, $P_3$, to be received by an array of seismic sensors or receivers $R_1$, $R_2$, $R_3$ respectively. Absent anisotropy, the wavefield is spherical. The sensors convert the mechanical earth motions (or pressure variations at sea) due to the received acoustic wavefield to electrical signals representative of the reflected seismic data. The received reflected seismic data signals are sent over lines 21, 23, 25 to suitable instrumentation such as a computer 22 and displayed by a display means 24 such as a computer monitor or as oscillographic traces on a photo-copy type cross section. A display may take the form of time scale recordings $T_1$, $T_2$, $T_3$, FIG. 2, as periodic functions of time $\tau_1$, $\tau_2$, $\tau_3$. Half the travel time $\tau_1$, multiplied by the appropriate average velocity $c_x$, $c_y$ (in the presence of anisotropy) provides the zero-offset depth to an incident point $P_k$ after a correction for angularity. Three receivers and three seismic traces and one source are shown by way of example but not by way of limitation. In practice, many hundreds of sources, spaced apart by several tens of meters, at different locations over an area of survey sequentially insonify the subsurface. Many thousands of sensors, spaced a few meters apart over the area in a regular grid, detect the resulting reflection data to provide a three-dimensional picture of the attitude and structure of the earth following suitable computerized signal processing including stacking, filtering and migration followed by subsequent display of the processed signals.

A number of processing techniques are known of which a preferred process is explicit finite difference migration. Migration of 3-D post-stack data using the explicit finite difference method requires a 2-D design of a transformation filter that is convolved with the data to implement 1-D extrapolation operators.

Hale, in a paper published in Geophysics, v.56, pp 1778–1785, 1991, entitled "*3-D depth migration via McClellan transformations*" describes a method wherein frequency- and velocity-dependent extrapolation operators are used to downward continue seismic wavefields in depth, one frequency at a time, by two-dimensional convolution with a circularly symmetric McClellan transformation filter. McClellan transformations however tend to exhibit strong dispersion artifacts for steep dips at 45° azimuth to the in-line and cross-line directions. The McClellan transformation is circularly symmetric for dips less than about 20° but becomes square at the Nyquist boundary, $k_x = k_y = \pi$.

Laplacian transformations have been introduced which overall, are more accurate than the McClellan transformation but they require long operators and are greedy of costly computer time in distributed-memory parallel computers. An advantage of Laplacian transformations however, is that they are adaptable to rectangular binning. See, for example, EPO patent application 0572321 A1, published Dec. 1, 1993 in the name of R. Soubaras, entitled *Procedure for processing signals from geophysical prospecting using an improved wavefield extrapolation operator.*

Hazra and Reddy published a paper entitled "*Design of Circularly Symmetric Low-pass Two-dimensional FIR Digital Filters Using Transformation*" in IEEE Transactions on Circuits and Systems, pp 1022–1026, October, 1986, present an accurate and efficient method for low pass filter application that can be adapted to the migration problem but their method is limited to the first-order square (3×3) transformations confined to the case where $\Delta x = \Delta y$.

There is a need for an efficient transformation filter that combines efficiency and economy of computer resources yet minimizes the loss of accuracy and the relative sample-size restrictions of known algorithms.

SUMMARY OF THE INVENTION

An aspect of this invention provides a Fourier synthesis approach to the design of an efficient and accurate transformation filter for use in 3-D post-stack migration combining the attributes of the more efficient McClellan transformation with those attributes of the more accurate Laplacian transformation to provide optimal intermediate results applicable to any size or shape transformation including the circumstance where $\Delta y > \Delta x$. The filter is unconstrained in that it is not required that it equal cos (k) along the $k_x$ and $k_y$ axes, where k is the wavenumber (spatial frequency) in radians/km. Also an average numerical mapping function over a plurality of azimuths is determined to define the difference between the ideal circular cos ($k_x$) Chebyshev argument and the actual transformation filter. That function prevents large errors from accumulating along specific azimuths such as 45° as with the McClellan and along the axes as in the Laplacian transformation. An efficient and accurate transformation filter is designed using Fourier synthesis. The method is an equally determined inverse problem to constrain the transformation at specified points in the ($k_x$,$k_y$) wavenumber plane. The number of points constrained is equal to the number of unique coefficients in the transformation filter and their location is chosen to provide migration dip accuracy where desired. Points can be defined along specified circular or elliptical contours of constant cos (k) where $$k = \sqrt{[k_x^2 + (\Delta x k_y/\Delta y)^2]} \ .$$

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
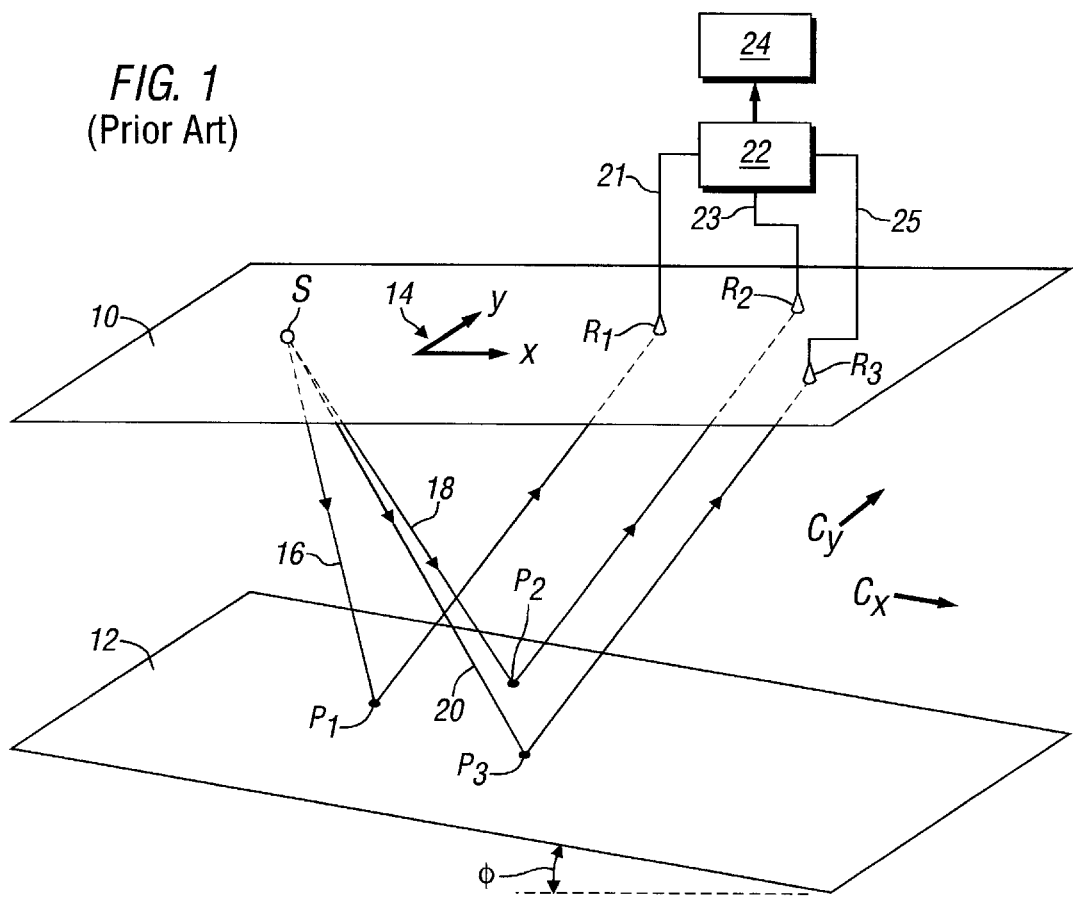
FIG. 1 is a drawing intended to present the basic principles of seismometry.
Figure 2:
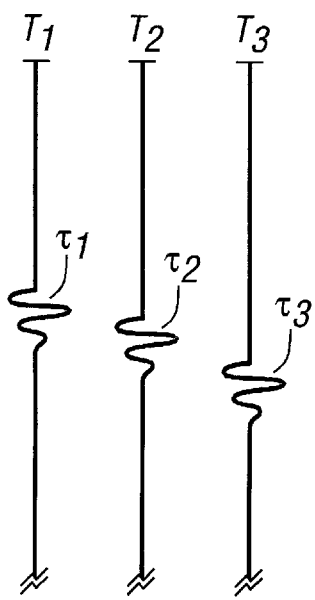
FIG. 2 illustrates the concept of time-scale recordings of periodic functions of time such as seismic traces.

Downward continuation of a wavefield in 2-D for each angular frequency ω is achieved by convolution with 1-D zero phase extrapolation filters, $h_{\omega/c}(n)$, $n=[-N,N]$ for $N+1$ unique coefficients, where c is velocity. A table of filters, $a_{\omega/c}(n)$, is optimally designed to have the spatial frequency response $$H(\omega/c,k) = \sum_{n=0}^{N} a_{\omega/c}(n)\cos(nk) \quad (1)$$

$\approx \exp\{i\Delta z/\Delta x[(\omega\Delta x/c)^2-k^2]^{1/2}\}$, where $a(0)=h(0)$, $a(n)=2h(n)$ for $n=[1,N]$; $\Delta x$ and $\Delta z$ are respectively the CDP interval, the migration depth step and $k=[0,\pi]$ is the normalized spatial frequency. Using the Chebyshev recursion relation leads to the Chebyshev filter structure for the table of extrapolation operators:

$$H(\omega/c,k) = \sum_{n=0}^{N} a_{\omega/c}(n)T_n[\cos(k)] \quad (2)$$

where $T_n(x)$ is the nth degree Chebyshev polynomial given by $$T_n[\cos(k)] = 2\cos(k)\cos[(n-1)k] - \cos[(n-2)k]. \quad (3)$$

For 3-D, a mapping relationship is defined between the Chebyshev argument cos (k) and some symmetric 2-D transform filter $F(k_x,k_y)$, $$F(k_x,k_y) = \sum_{l=0}^{L}\sum_{m=0}^{M} t(l,m)\cos(lk_x)\cos(mk_y). \quad (4)$$

where L and M are small, on the order of 1 to 4 for efficiency and t(l,m) is a small symmetrical 2-D convolutional operator. The only absolute constraint on (4) is that $|F(k_x,k_y)| \leq 1$ to remain within the bounds of the Chebyshev argument. Thus equation (2) becomes $$H(\omega/c,k_x,k_y) = \sum_{n=0}^{N} a_{\omega/c}(n)T_n[F(k_x,k_y)] \quad (5)$$

where $F(k_x,k_y)$ is intended to provide a circular or elliptical response in the ($k_x,k_y$) plane, equal to cos (k).

The principal features of this invention may be summarized as:

1) The transformation filters are designed and used for migration where the constraint that $F(k_x, 0)=\cos (k_x)$ is relaxed. That feature improves accuracy with only a moderate reduction in the degrees of freedom when designing 1-D extrapolation operators.

2) The coefficients of t(l,m) in (4) are computed by Fourier synthesis as opposed to least squares or Chebyshev optimization. This turns out to be a fast, efficient method for constraining specific points and contours in the ($k_x, k_y$) wavenumber domain to have minimum error. It is also general in many ways: the size or shape of transformation filters are not restricted but include everything from McClellan (square-shaped) to Laplacian (cruciform) transformation end members. Furthermore, elliptical transformations can be designed where $\Delta y > \Delta x$.

3) A numerical mapping function is computed to describe the difference between the designed transformation $F(k_x,k_y)$ and the required response cos ($\sqrt{[k_x^2+(\Delta x k_y/\Delta y)^2]}$) for Chebyshev recursion. Although an analytical relation can be obtained in principle, a numerical relation that depends directly on t(l,m) allows for compensation of specific errors. Thus the average azimuthal response can be used so that non-circular errors are distributed evenly in many directions and are not confined to specific directions as in the McClellan transformation (45° to axes) or the Laplacian transformation (along the axes).

The Fourier synthesis approach constrains the transformation filters at specific points in the ($k_x,k_y$) plane. Fourier synthesis is an equally determined inverse problem to solve for the transformation filter coefficients t(l,m). Equation (4) can be written as $$F_i = W_{i,j}t_j. \quad (6)$$

where W is a square (n×n) matrix of cosine terms from the 2-D spatial Fourier transformation. The functional form for computing F may be anything but is preferably given by $F=\cos (\sqrt{[k_x^2+(\Delta x k_y/\Delta y)^2]})$ for circular or elliptical symmetry as above stated. The $t_j$ are the unique set of coefficients of the transformation filter in vector form, and F is a vector of desired responses, valid only at selected points, i, in the ($k_x,k_y$) plane. In this approach, the number of points (i=1,n) is equal to the number of unique coefficients (j=1,n) where the subscript j denotes specific elements of $t_j$ and the repeated subscript, j, implies summation. Expanding (6) gives $$F(k_{x_i},k_{y_i}) = \sum_{j=1}^{n} \cos(lk_{x_i})\cos(mk_{y_i})t_j(l,m) \quad (7)$$

where the indices (l,m) depend explicitly on the index j. For the 3×3 case demonstrated here, the relationship of the set of the $t_j(l,m)$ is $t_1(0,0)$, $t_2(1,0)$, $t_3(0,1)$, $t_4(1,1)$; the transformation coefficients are numerically ordered in a selected manner.

Formulation (7) may be expanded into i=(1,n) equations of the same form where n is the number of unique coefficients in the transformation $t_j$. Each equation corresponds to a selected point in the ($k_x,k_y$) plane where $t_j$ will have the response $F(k_x,k_y)$. Please refer to FIG. 3. For the 3×3 McClellan transformation of the prior art, that is, the bold contours 26 of FIG. 3, the points on the ($k_x,k_y$) plane used to constrain the transformation to the Chebyshev argument, cos ($k_x$), dashed curve 28, are the corners ($k_x,k_y$)=(0,0), (0,π), (π,0) and (π,π). Observe the gross departure of contour 26 from circularity. At the Nyquist boundary, for 45°, the contours are square.

Figure 3:
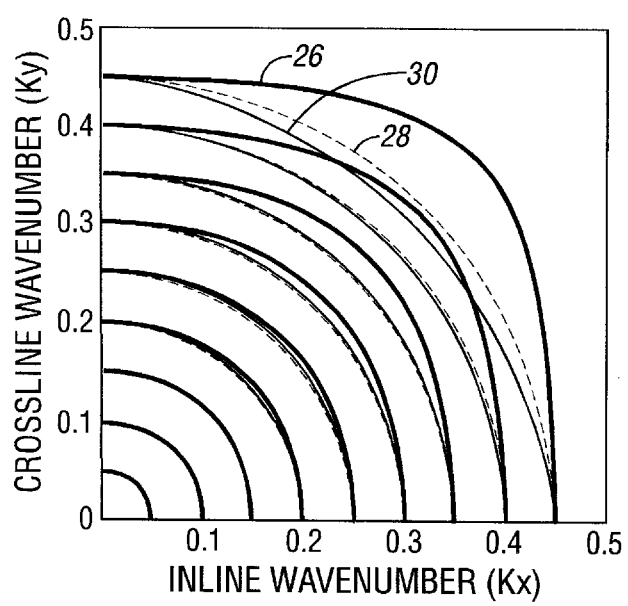
FIG. 3 shows a comparison between the known McClellan transformation filter and the filter proposed by this invention as compared to the circularly symmetric Chebyshev argument in the ($k_x, k_y$) wavenumber domain.

For the 3×3 unconstrained transformation of this invention, shown by the thin contours such as 30 of FIG. 3, the points in the ($k_x,k_y$) plane are the origin ($k_x,k_y$)=(0,0) and three points on the 0.75 Nyquist circular contour. The three points are along the axes at $(k_x,k_y)=(0,3\pi/4)$, $(3\pi/4,0)$ and at 45° at $(3\pi/4\sqrt{2}, 3\pi/4\sqrt{2})$.

Figure 4:
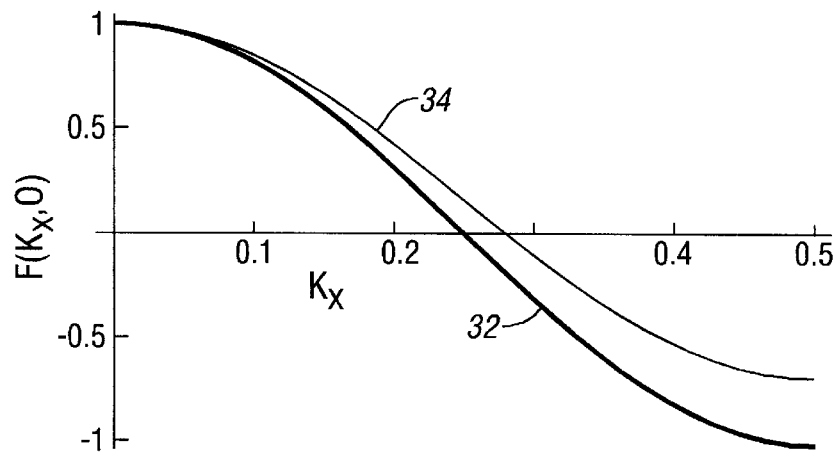
FIG. 4 shows the difference along the $k_x$ axis between the Chebyshev cos ($k_x$) argument, bold curve, and the unconstrained transformation filter.

After the t(l,m) are determined by inverting equation (6) with the aid of (7), the actual transformation response may be $|F|>1$ near the Nyquist boundary. As a result, the transformation coefficients must be scaled and shifted such that $F(0,0)=1$ and $|F|\leq 1$ everywhere, for use in computing the extrapolation operators in (5) and for migration. Scaling and shifting of the transformation filter does not alter the symmetry properties. Thus, the unconstrained response (thin contours 30) shown in FIG. 3 has the response of a scaled and shifted cosine function given by $$F(k_x, 0) = a \cos(k_x) - b, \quad (9)$$

where a is the scale factor and b is the shift factor. FIG. 4 shows the difference along the x-axis between the Chebyshev cos ($k_x$) argument, bold curve 32 and the unconstrained transformation filter of this invention, thin curve 34.

When $F(k_x,k_x) \neq \cos(k)$, the overall response of the extrapolation operators $H(\omega/c,k_x,k_y)$ in (5) will be incorrect. To correct the error, a new set of coefficients $a'_{\omega/c}(n)$ are computed taking into account the difference between the response of the transformation filter and the Chebyshev argument $[F(k_x, 0) - \cos(k')]$. Given the response of the transformation filter $F(k_x, 0)$ along the x axis, it is necessary to find the correct value for k' that will make the difference equal to zero:

$$F(k_x, 0) - \cos(k') = 0 \quad (10)$$

so that $$k' = \cos^{-1}[F(k_x,0)] = \cos^{-1}[a \cos(k_x) - b] \quad (11)$$

where $F(k_x,0)$ is computed analytically from the known scaled and shifted transformation filter from (4) or (7) above.

An important point here is that the k' are new wavenumber coordinates of the 1-D extrapolation operator coefficients $a'_{\omega/c}(n)$ in (5). These new coordinates compress the wavenumber response of the operators towards the origin in order to compensate for the effective stretch in $F(k_x,0)$ away from the origin and $[\cos(k_x)]$ in FIG. 4. Using these altered extrapolation operators with the transformation filter that does not equal the Chebyshev argument results in the correct overall response, $H(\omega/c, k_x,k_y)$ for migration.

Equation (11) defines the wavenumber mapping relationship between the desired response $\cos(k_x)$, and the actual response, $F(k_x,k_y)$, of the transformation filter. Mapping is required because the purpose of the transformation filter is to define $\cos(k_x)$ as accurately as possible using a low-order numerical filter [t(l,m)], which for 3-D migration is a 2-D filter depending on x and y.

Typically, the mapping relationship between $k_x$ and k' in (11) is computed analytically, resulting in an exact correction along the axes. This accuracy is illustrated in FIG. 3 where the contours of the unconstrained transformation are coincident with the circular contours at the $k_x$ and $k_y$ axes. Off the axes, at 45°, the correction is not as good due to the non-circular symmetry of the transformation.

The object of this teaching is to compute a mapping relationship between $k_x$ and k' which is an average over many directions or azimuths in order to further reduce symmetry errors in unconstrained transformations. This is accomplished by evaluating $F(k_x,k_y)$ in (11) numerically in many directions rather than along the x-axis alone. From FIG. 3, it is apparent that the error is zero along four major axes but becomes a maximum at 45°. Had the mapping relation been computed at 45°, the errors would have been zero for those four azimuths but maximal along the major axes. Using an azimuthally averaged transformation $\bar{F}(k_x,k_y)$ in (11) accomplishes a reduction of errors in FIG. 3 by one half and an exact response in eight directions where the errors are zero.

Figure 5:
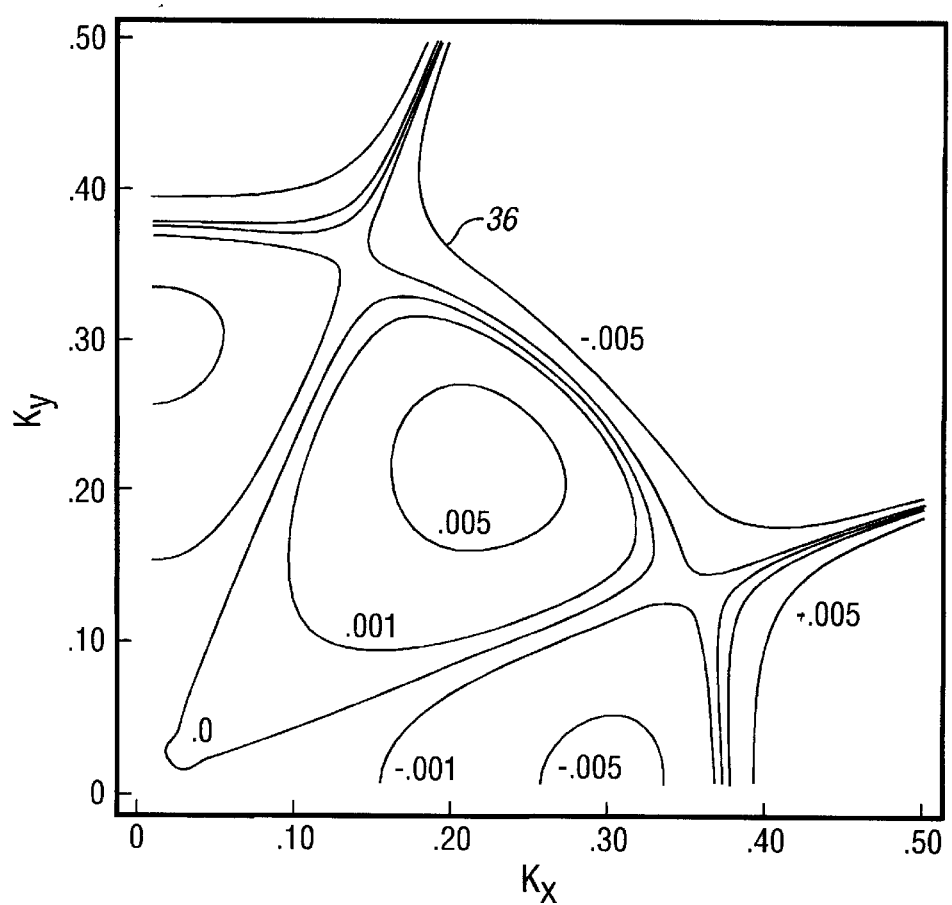
FIG. 5 shows the error contours between the unconstrained transformation and the average transformation.

FIG. 5 shows the difference or error contours such as 36, between the actual transformation $F(k_x,k_y)$ and the average $\bar{F}(k_x,k_y)$. Observe that the error is near zero around the absolute wavenumber $|k|=3\pi/4$ where the transformation was designed to be the most accurate. Errors at 45° are equal but opposite in sign to those along the axes and half as much as in FIG. 3. At 22.5° and 67.5°, to the k axis, the transformation is exact, resulting in eight directions that have zero error.

This invention has been described with a certain degree of specificity by way of example but not by way of limitation. Those skilled in the art will devise obvious variations to the examples given herein. For example, a 5×5 filter may be used economically in place of a 3×3 filter. This invention is limited only by the appended claims.

What is claimed is:

1. A system for geophysical exploration of subsurface formations, comprising:

an acoustic source for radiating an acoustic wavefield for insonifying said subsurface formations;

an array of seismic receivers responsive to wavefields reflected from said insonified subsurface formations for providing electrical signals representative of the reflected wavefields, said receivers being disposed over a spatial coordinate grid having preselected principal spatial axes;

a programmed computer coupled to said array of seismic receivers for receiving said electrical signals and for synthesizing a transformation filter as a function of wavenumber;

said computer being further programmed to scale and shift said synthesized transformation filter;

means associated with said computer for defining a wavenumber mapping relationship between a numerically averaged response of the scaled and shifted transformation filter over all azimuths and the Chebyshev argument $\cos(k_x)$;

said computer further being programmed to apply said averaged, scaled and shifted transformation filter to the received electrical signals; and a display means in communication with said computer for displaying the filtered electrical signals.

2. The system as defined by claim 1, wherein:

said averaged, scaled and shifted transformation filter is an unconstrained wavenumber function when referred to the principal spatial coordinate axes of the seismic receiver array spatial grid.

3. The system as defined by claim 2, wherein said computer is programmed to define said synthesized transformation filter from the formulation $$F_i = W_{i,j} t_j,$$

which may be expanded as $$F(k_{x_i}, k_{y_i}) = \sum_{j=1}^{n} \cos(mk_{x_i})\cos(mk_{y_i}) t_j(l,m),$$

where
   W is a (n×n) matrix of cosine terms,
   $t_j$ comprise a unique set of coefficients, $(i=1,n)=(j=1,n)$ is the number of unique coefficients, j is a specific element of the $t_j$, l, m depend explicitly on j.

4. The system as defined by claim 3, wherein:

said computer is further programmed to scale and shift said synthesized transformation filter to satisfy the relationship $|F(k_x,k_y)| \leq 1.0$.

5. The system as defined by claim 3, wherein:

said computer is further programmed to derive new extrapolation operator coefficients, $a'_{\omega/c}(n)$, [n=1.N], said coefficients having wavenumber coordinates k' given by $k' = \cos^{-1}[F(k_x,0)]$.

6. The system as defined by claim 5, comprising:

in said computer, replacing $F(k_x,0)$ by $F(k_x,k_y)$ which is iteratively numerically averaged over all azimuths.

* * * * *